United States Patent [19]

Kozlowski et al.

[11] Patent Number: 4,563,975
[45] Date of Patent: Jan. 14, 1986

[54] TIRE SOAPING APPARATUS FOR TIRE MOUNTING

[75] Inventors: Chester P. Kozlowski, Royal Oak; Thomas J. Curcuri, Grosse Pointe Woods, both of Mich.

[73] Assignee: Dominion Tool & Die Co., Roseville, Mich.

[21] Appl. No.: 544,857

[22] Filed: Oct. 24, 1983

[51] Int. Cl.⁴ .............................................. B05B 13/02
[52] U.S. Cl. ...................................... 118/320; 157/21; 157/20; 414/426
[58] Field of Search ................. 425/809; 157/21, 20; 198/345, 374, 414; 427/425; 118/320, 322, 409; 414/426, 433

[56] References Cited

U.S. PATENT DOCUMENTS

| | | | |
|---|---|---|---|
| 684,568 | 10/1901 | Gardner et al. | 118/409 |
| 2,553,191 | 5/1951 | Hettinger | 118/320 |
| 2,608,177 | 8/1952 | Powers | 118/320 |
| 2,613,634 | 10/1952 | Johns et al. | 118/322 X |
| 3,359,938 | 12/1967 | Klemmer | 118/409 |
| 4,457,419 | 7/1984 | Ogami et al. | 198/345 |

*Primary Examiner*—Shrive P. Beck
*Attorney, Agent, or Firm*—Harness, Dickey & Pierce

[57] ABSTRACT

A mechanism for lifting wheels from a conveyor and positioning them in a wheel soaping mechanism. Also included is a device for rotating a lifted wheel through 360° for presentation to a spray nozzle for soaping the wheel. The rotating mechanism is adapted to rotate each sequentially presented wheel in a direction opposite to that of the previously presented wheel.

21 Claims, 10 Drawing Figures

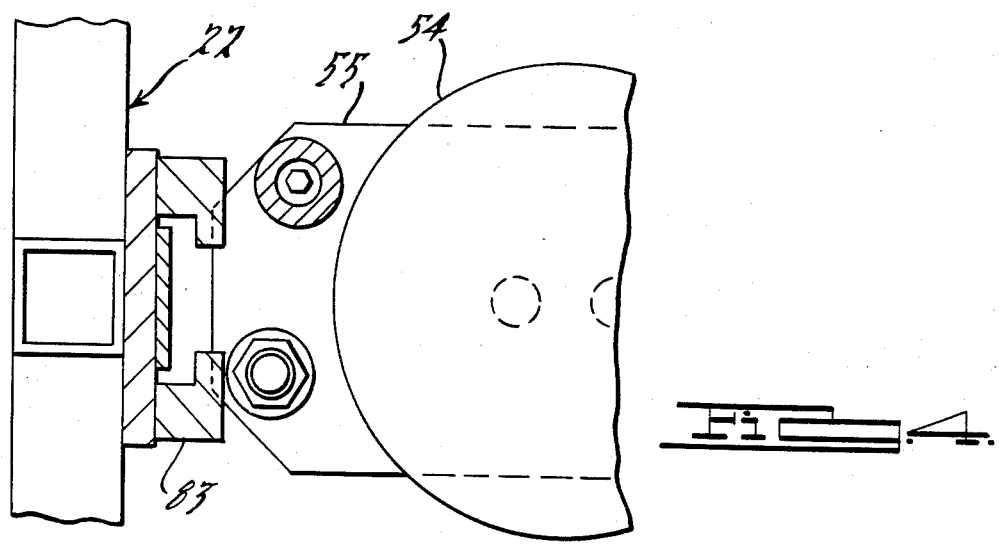
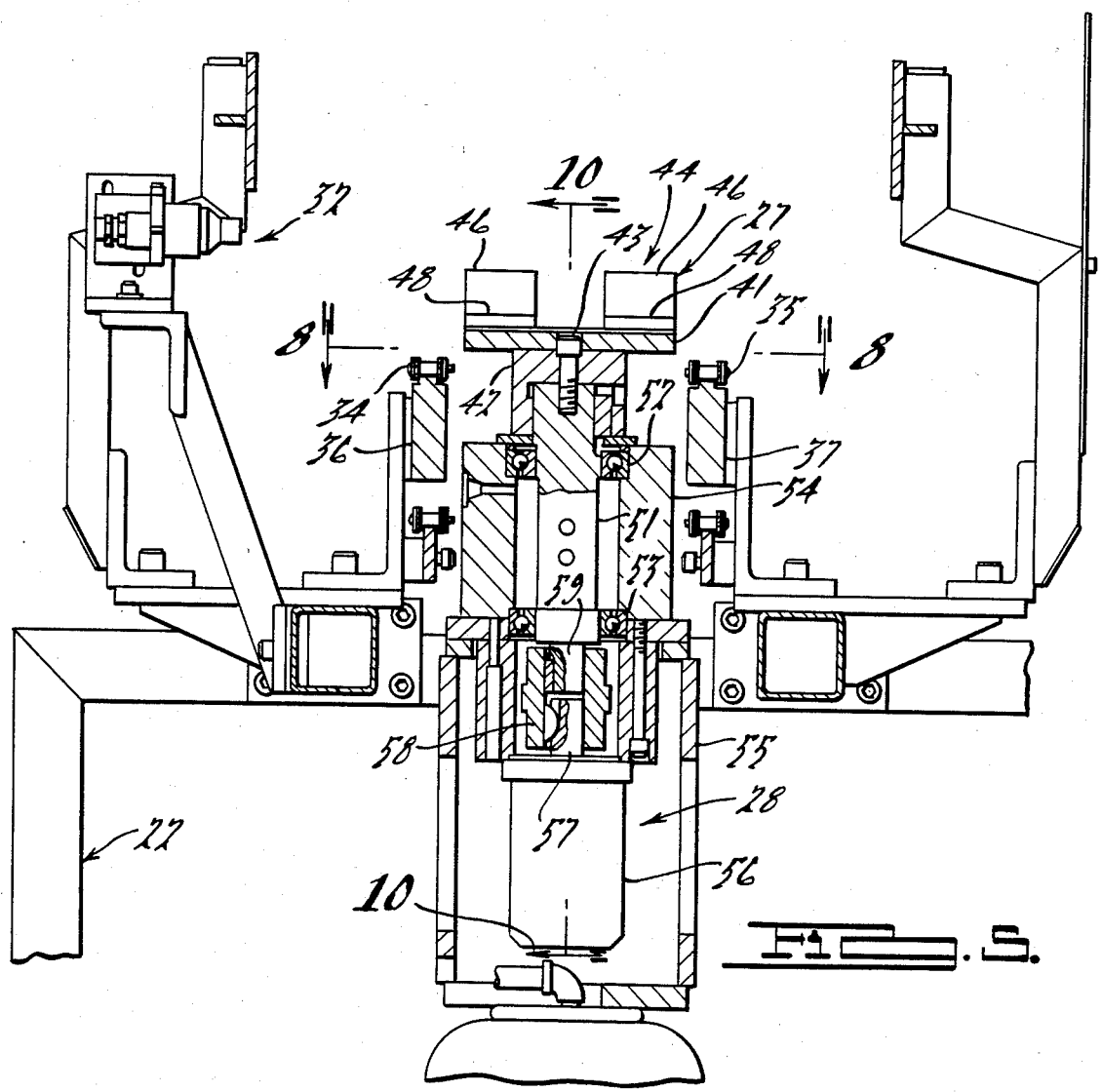

TIRE SOAPING APPARATUS FOR TIRE MOUNTING

BACKGROUND OF THE INVENTION

This invention relates to a wheel handling apparatus and more particularly to an apparatus for handling vehicle wheels and treating them prior to the mounting of a tire thereon.

Automated equipment has been proposed for mounting tires on vehicle wheels and for inflating them. Such apparatus must be capable of handling a wide variety of wheel sizes and types and corresponding tire sizes and types. With such apparatus, a wheel is moved through a plurality of stations wherein different steps in the tire mounting process are accomplished. In connection with such arrangements, it is desirable to provide a mechanism for removing wheels from a conveyor and moving them into a station where an operation can be performed and then returning them to the conveyor. As noted above, such apparatus should be capable of handling a wide variety of wheel sizes and types.

It is, therefore, a first object of this invention to provide an improved wheel handling device for an automated wheel line.

It is another object of this invention to provide a wheel handling apparatus that is adapted to engage a wheel on a conveyor and lift the wheel from the conveyor into a station where work may be performed on it.

One of the more important steps in mounting tires on wheels involves the soaping of the wheel prior to mounting of the tire onto it. Soaping lubricates the wheel so that the tire will not be damaged when it is mounted and so that it will properly engage the bead seats when it is inflated. Although a variety of devices have been proposed for automatically soaping or lubricating wheels, the previously proposed devices have been relatively complicated in operation and also have not been adaptable to handle a wide variety of wheel sizes and types.

It is, therefore, a still further object of this invention to provide an improved device for soaping wheels.

It is another object of this invention to provide an improved arrangement for presenting a wheel to a soaping mechanism and one that is adapted to handle a wide variety of different types of wheels in succession.

SUMMARY OF THE INVENTION

A first feature of this invention is adapted to be embodied in an apparatus for performing an operation on a vehicle wheel before mounting a tire thereon. The apparatus includes conveyor means for moving wheels along a fixed path through a station where the operation is to be performed. Intercept means are position in proximity to the station and are movable between a free position wherein wheels may be moved along the conveyor means through the station, a stop position where wheels delivered to the station by the conveyor means will engage the intercept means and be stopped thereby while still on the conveyor means and a work position wherein a wheel engaged with the intercept means will be raised from the conveyor means. Power means are provided for moving the intercept means selectively between the positions.

Another feature of the invention is adapted to be embodied in an apparatus for performing an operation on a series of sequentially presented vehicle wheels before mounting a tire thereon. Such an apparatus includes wheel support means that is adapted to support a wheel thereon. Power means are provided for rotating the wheel support means and a wheel supported thereby in selected opposite directions. Control means are incorporated for operating the power means to rotate the wheel support means from a home position in a first sense through a predetermined arc to a stopped condition when a first wheel is presented on the wheel support means and then in an opposite sense through the predetermined arc back to the home position when another wheel is presented thereon so that sequentially presented wheels will be rotated through the same arc in opposite senses.

BRIEF DESCRIPTION OF THE DRAWINGS

FIG. 4 is an enlarged cross-sectional view taken along the line 4—4 of FIG. 2.

FIG. 5 is a cross-sectional view taken along the line 5—5 of FIG. 2.

DETAILED DESCRIPTION OF THE PREFERRED EMBODIMENT

Figure 1:
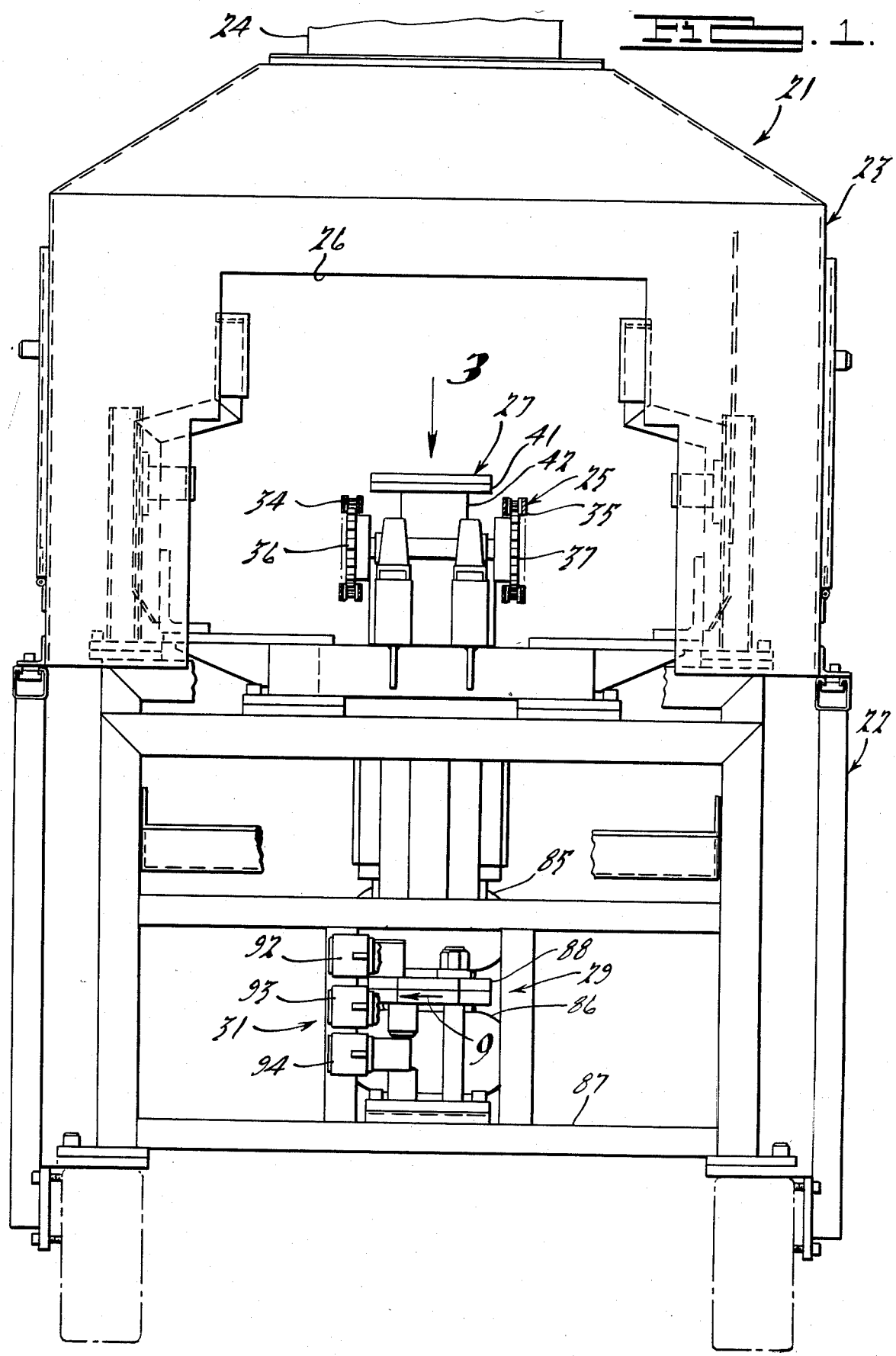
FIG. 1 is an end elevational view looking into a wheel operating station constructed in accordance with an embodiment of the invention.
Figure 2:
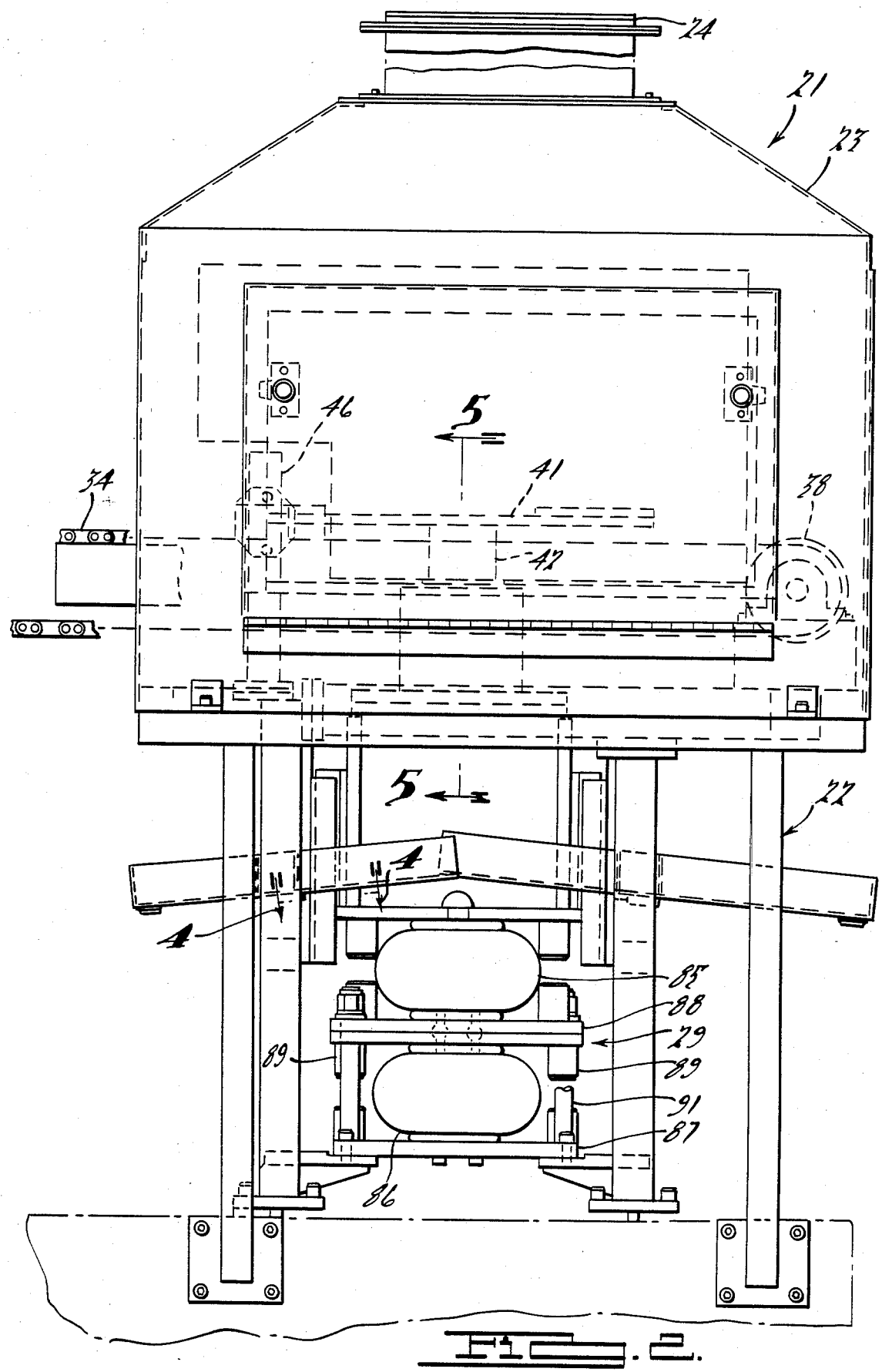
FIG. 2 is a side elevational view of the work station.
Figure 3:
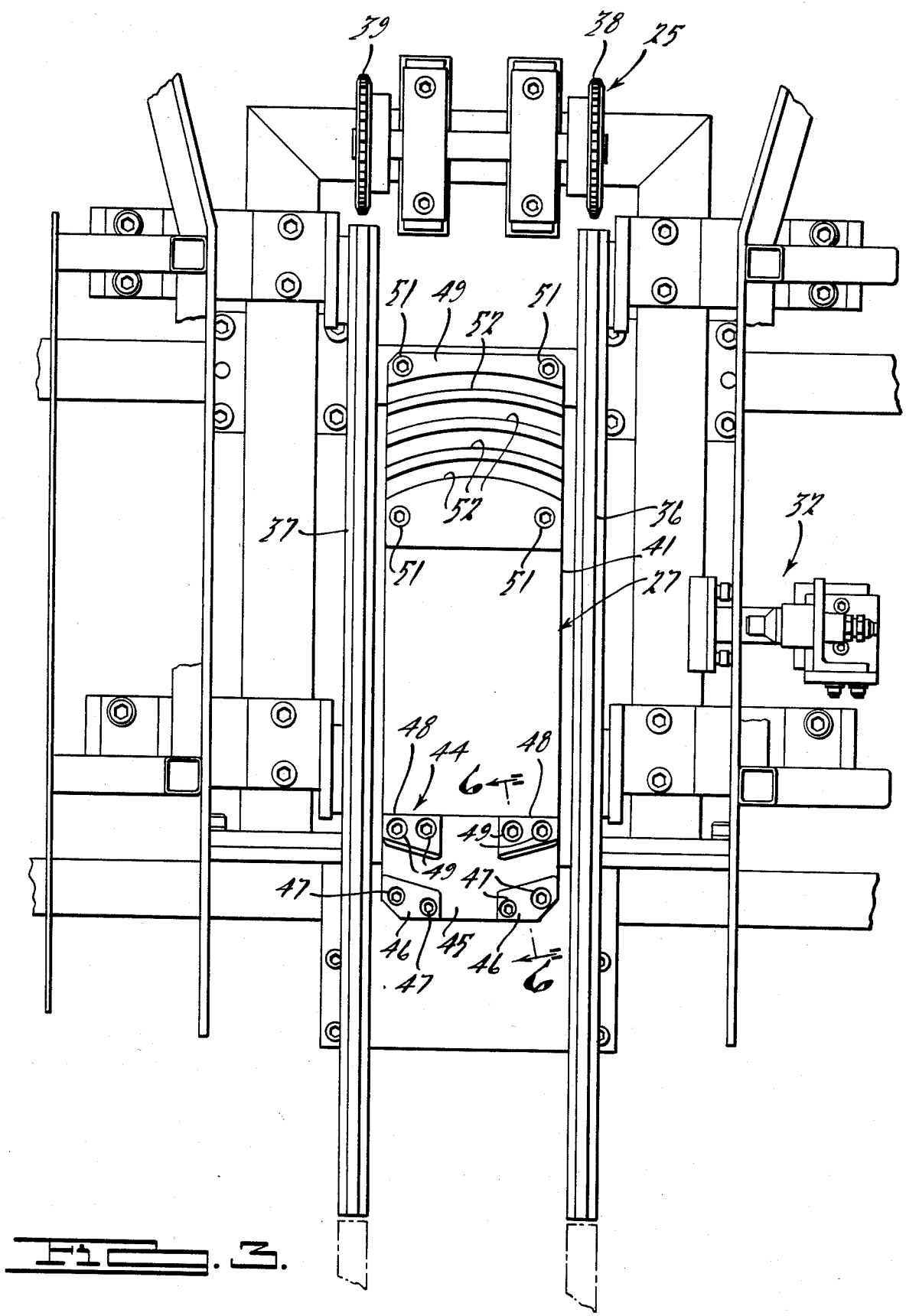
FIG. 3 is a top plan view of the station, on an enlarged scale and taken generally in the direction of the arrow 3 in FIG. 1.

In the drawings, the reference numeral 21 illustrates generally a station of an automated wheel assembly line. In the illustrated embodiment, the station 21 is a soaping station wherein wheels with tires not yet mounted on them will be soaped so as to lubricate the wheel and tire during subsequent mounting operations and during inflation, which steps may be accomplished in further stations along the line. The main components of the station 21 include a base assembly 22 over which a protective shroud 23 is positioned. An exhaust device 24 is formed at the upper end of the shroud 23 so that vapors may be drawn off from the station 21 through a suitable exhaust fan.

A conveyor assembly, indicated generally by the reference numeral 25 extends through the station 21 so as to sequentially deliver wheels to the station 21 and then move these wheels on to subsequent stations. The body of the shroud 23 is formed with openings 26 that are aligned in the direction of travel of the conveyor 25 so as to pass the conveyor 25 as well as wheels carried by it.

Figure 10:
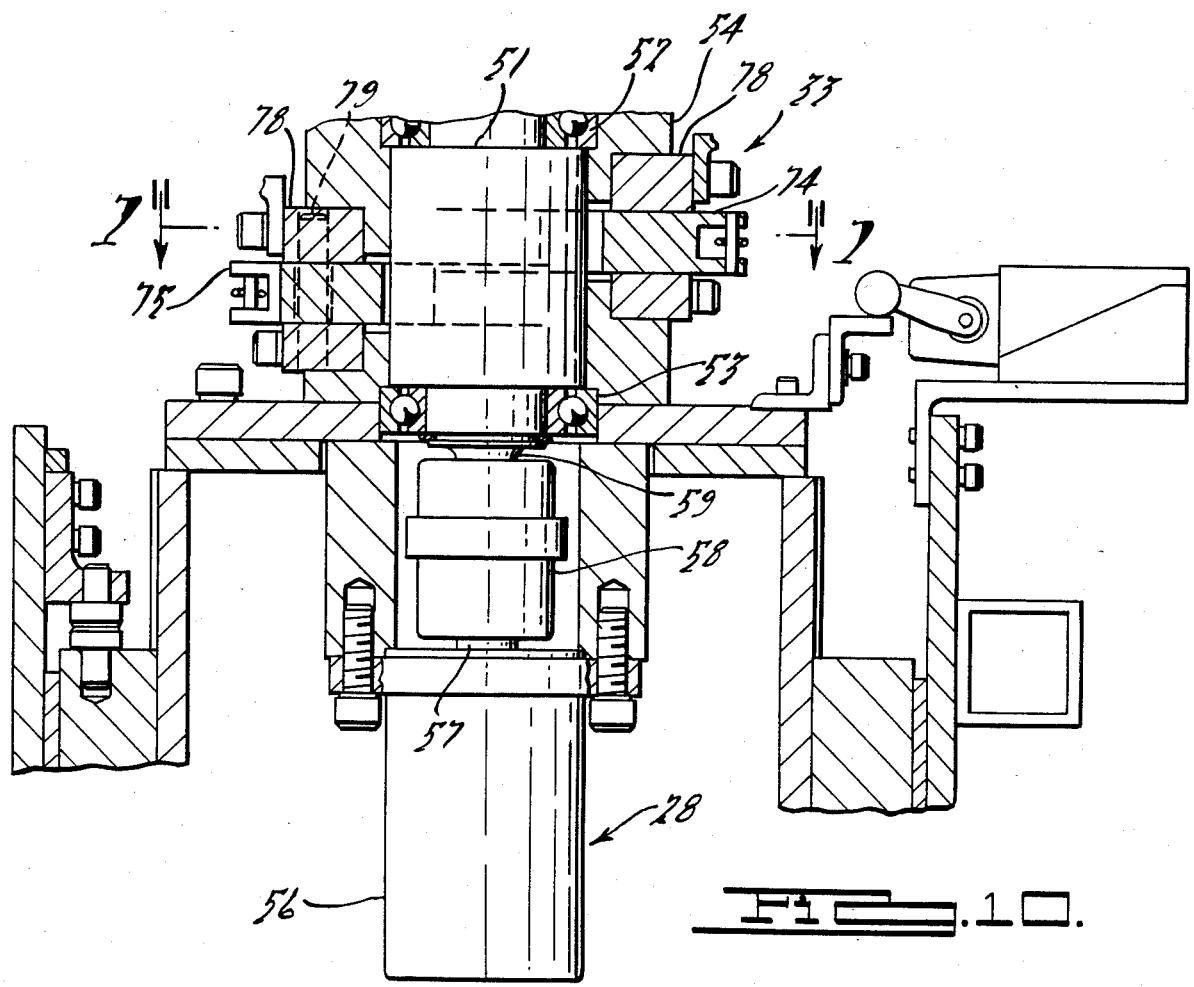
FIG. 10 is an enlarged cross-sectional view taken along the line 10—10 of FIG. 5.

A wheel intercept and supporting assembly, indicated generally by the reference numeral 27, is positioned within the station 21 and is adapted to be rotated by a driving mechanism, indicated generally by the reference numeral 28 (FIGS. 5 and 10). In addition, an elevating mechanism, indicated generally by the reference numeral 29, is provided for lifting the wheel intercept and supporting assembly 27 and wheels carried thereby from a lowered, free position to a raised intercept position, and a further raised, soaping position. A limit switch assembly 31 is incorporated for controlling the lifting of the support 27 and the wheels carried by it. When the wheels are raised to their soaping position, a spray nozzle 32 will discharge a lubricant or soap onto the wheel so as to accomplish the soaping or lubricating operation. The rotating device 28 is operated by means of a control mechanism, indicated generally by the reference numeral 33, and shown in most detail in FIGS. 7, 8 and 10 so that a first wheel will be rotated in one direction and the next presented wheel will be rotated in the opposite direction, as will become apparent.

The conveyor 25 is of the chain type and has parallel transversely spaced chains 34 and 35 which are positioned on opposite sides of the wheel supporting device 27 and which are supported intermediate their ends by respective rails 36 and 37 that are carried by the frame assembly 22 in a suitable manner. At their entry end, the chains 34 and 35 are trained over idler sprockets 38 and 39 which are positioned in proximity to a further conveyor, not shown, which transfers wheels from a feed station onto the conveyor 25 for passage through the station 21. The opposite ends of the chains 34 and 35 extend into the next station where they are trained over drive sprockets (not shown) that are driven in any suitable manner.

The wheel intercepting and supporting assembly 27 is of a construction best shown in FIGS. 1, 2, 3 and 5 and consists of an elongated base plate 41 that is affixed to a generally cup shaped member 42 by means of one or more socket headed screws 43. A wheel intercepting assembly, indicated generally by the reference numeral 44 is positioned at the discharge end of the conveyor 25 and consists of a plate 45 to which a pair of upstanding intercept elements 46 are affixed by means of socket headed screws 47. The members 46 have inclined faces that are adapted to engage a wheel, in a manner to be described, as it is presented to the station 21. Cooperating with the intercepting members 46 are a pair of additional members 48 that are affixed to the plates 45 and 41 by socket headed screws 49. The members 46 and 48 define a generally V shaped groove as may be readily seen from FIG. 3, that is adapted to engage the rim of a plurality of different size wheels.

A second plate 49 is affixed to the opposite end of the plate 41 by means of a plurality of socket headed screws 51. The plate 49 is formed with a plurality of cylindrical recesses 52 each of which is adapted to engage a wheel rim of a diameter of the type to be handled by the equipment within the station 21. The recesses 52 are aligned with the recess defined by the members 46 and 48 and will, through cooperation with the various size wheels to be handled, support wheels of this size and also restrain their relative movement once the assembly 27 is elevated, as will become apparent.

Referring now primarily to FIGS. 5 and 10, the cup shaped member 42 and plate 41 are affixed by the socket head screws 43 to a shaft 51 that is journalled for rotation by means of a pair of spaced bearings 52 and 53 in a cylindrical support 54. The cylindrical support 54 is, in turn, affixed to a supporting frame 55 in a suitable manner as by welding.

The frame 55 contains the driving device 28 which includes a hydraulic or pneumatic motor 56 that is supplied with powering fluid from a suitable source (not shown). As will become apparent, the motor 56 is adapted to be driven in either of two directions through the use of a suitable controlling valve arrangement. The motor 56 has an output shaft 57 that is coupled by means of a coupling 58 to a downwardly extending projection 59 of the shaft 51 so that the shafts 57 and 51 as well as the wheel supporting assembly 27 are rotatably coupled together.

Figure 8:
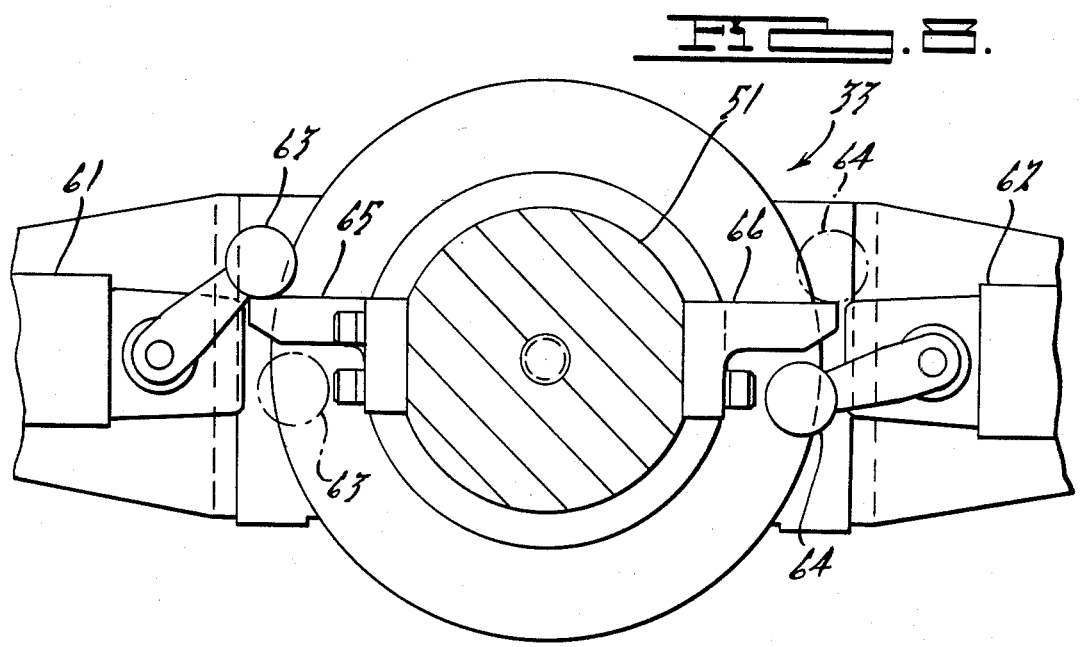
FIG. 8 is an enlarged cross-sectional view taken along the line 8—8 of FIG. 5.

The control mechanism 33 for the motor 56 includes a pair of limit switches 61 and 62 (FIG. 8) that are mounted in a suitable manner at the upper end of the cylindrical member 54 on diametrically opposite sides of the shaft 52. The limit switches 61 and 62 have actuating elements 63 and 64 that are pivotally supported on the respective switches 61, 62 and which are juxtaposed to a pair of generally L shaped actuating stops 65 and 66 that are affixed to the upper end of the shaft 51. FIG. 8 shows the switch 61 in a closed position and the switch 62 in an opened condition and the dotted line views of the actuating elements 63 and 64 in FIG. 8 represent the opposite conditions. That is, the dotted line view of the element 63 shows the opened condition for the switch 61 and the dotted line representation of the element 64 shows the switch 62 in its closed condition. The elements 65 and 66 and the corresponding switches 61 and 62 and their actuating elements 63, 64 are disposed at slightly different levels from each other so that the stop element 65 will not contact the actuating element 64 of the switch 62 and the stop element 65 will not contact the actuating element 63 of the switch 61. Said a slightly different way, the stop elements 65 and 66 and their associated switches 61, 62 are actually offset along the axis of the shaft 51.

FIG. 8 illustrates the condition when the shaft 51 has been rotated in a clockwise direction so that the stop element 65 will contact the switch actuating element 63 so as to close the switch 61. The shaft 51 will then be rotated next by the motor 56 in a counterclockwise direction so as to reopen the switch 61 and so that the stop element will, after having rotated through 360° contact the switch element 64 so as to close the switch 62 while the switch 61 will then be opened.

The mechanism 33 also includes a positive stop for positively stopping the rotation of the shaft 51 when it has rotated through a full 360°. This mechanism may be best seen in FIGS. 7 and 10. The portion of the shaft 51 contained within the cylindrical member 54 is provided with a pair of axially spaced, generally diametrically oppositely located recesses 67 and 68. Each recess 67 and 68 consists of a relieved camming portion that ends in a generally radially extending stop surface 69, 71. The cylindrical member 54 is provided with a pair of axially extending diametrically spaced recesses 72 and 73 in which stop levers 74 and 75, respectively, are located. The stop lever 74 has a surface 76 that is adapted to engage the shaft stop surface 69, while the lever 75 has a corresponding stop surface 77 that is adapted to engage the shaft surface 71. Each stop lever 74, 75, is supported within its respective recess 72, 73, by a supporting block assembly 78 and pivot pin 79. A coil compression spring 80 engages the outer ends of the levers 74, 75 and the block 78 so as to bias the levers 74, 75 in clockwise and counter clockwise directions, respectively.

When the shaft 51 is rotating in a counterclockwise direction, the recess surface 69 will engage the stop surface 76 of the lever 74 so as to positively halt the rotation of the shaft in that direction. When the shaft 51 is rotating in a clockwise direction, the recess surface 71 will engage the stop surface 77 of the stop lever 75 to positively stop rotation in this direction. It should be readily apparent that the non-operative stop lever 74, 75, will be biased out of engagement by the contact of the external surface of the shaft 51 with the backside of the respective lever and by the respective spring 80.

The mechanism for raising and lowering the wheel supporting device 27 may be best seen in FIGS. 1, 2, 4 and 5. As has been previously noted, the wheel supporting member 27 and shaft 51 are journalled by the supporting cylindrical member 54 but are axially fixed relative to it. The member 54, as has been previously noted, affixed to the frame 55. The frame 55 includes a pair of outwardly extending guides 81, 82 (FIG. 7) that are engaged with ways 83, 84, carried by the frame 22 so as to support the frame 55, shaft 51 and wheel supporting member 27 for movement in a vertical direction.

The mechanism 29 is provided for achieving this vertical movement and includes a first air bag 85 that is engaged with the underside of the frame 55. The air bag 85 is supported upon a second air bag 86, in a manner to be described, which second air bag is, in turn, supported upon a plate 87 of the frame 22.

A plate assembly 88 is interposed between the air bags 85 and 86 and carries a plurality of depending cylindrical members 89 that are supported on guide rods 91 so that inflation of the bag 86 will cause the bag 85 and plate assembly 88 also to move in a confined vertical direction. When the bags 85 and 86 are both fully deflated, the wheel supporting member 27 will be positioned between the conveyor chains 34 and 35 so that wheels may pass freely through the station 21. When the bag 85 is inflated and the bag 86 is deflated, the wheel supporting member 27 will be positioned so that the wheel intercepting members 46 are disposed above the level of the chains 34 and 35 so as to be engaged by a wheel travelling along the conveyor 25. When both the bags 85 and 86 are inflated, the wheel and its supporting member 27 will be raised above the conveyor 25 so that the wheel will be lifted from the conveyor 25 and into proximity with the spray nozzle 32.

Figure 9:
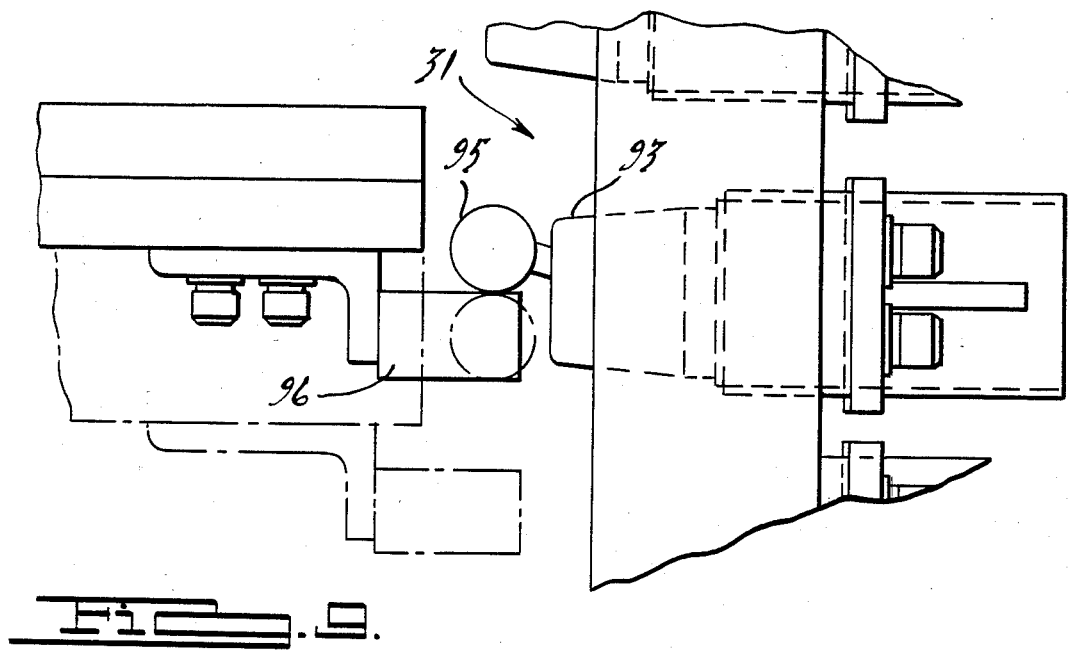
FIG. 9 is an enlarged view looking generally in the direction of the arrow 9 in FIG. 1.

The control system 31 for the vertical positioning of the wheel supporting member 27 consists of three vertically spaced limit switches 92, 93 and 94. Each limit switch 92 through 94 has a control arm 95 (FIG. 9) that is disposed in a position to be engaged by a corresponding stop block 96 carried by the plate assembly 88 so as to indicate whether the bags 85 and 86 are both deflated, whether only the bag 85 is deflated or whether the bags 85 and 86 are both inflated. When both bags are deflated, the limit switch 94 will be actuated, when only the bag 85 is inflated, the switch 93 will be actuated and when both bags 85 and 86 are inflated, the switch 92 will be actuated.

OPERATION

At the beginning of the operation, both of the air bags 85 and 86 are deflated and the conveyor 25 is operated so that wheels may freely pass through the station 21. When it is desired to begin the soaping operation, the bag 85 is inflated under the operation of a suitable control circuit and the switch 93 will be actuated to indicate that inflation has been completed. The wheel supporting member 27 will then be positioned so that the intercepting members 46 are disposed so as to be engaged by the rim of a wheel travelling along the conveyor 25.

When a wheel engages the member 46, the conveyor 25 will tend to stall and this increased load on its driving mechanism is sensed in a suitable manner. A signal is then given to inflate the bag 86 in addition to the bag 85 so as to raise the wheel supporting member 27 and wheel supported thereby into proximity to the spray nozzle 32. When the bag 86 and bag 85 are fully inflated, the switch 92 will send a signal and spray may be initiated from the nozzle 32 in appropriate manner.

Figure 7:
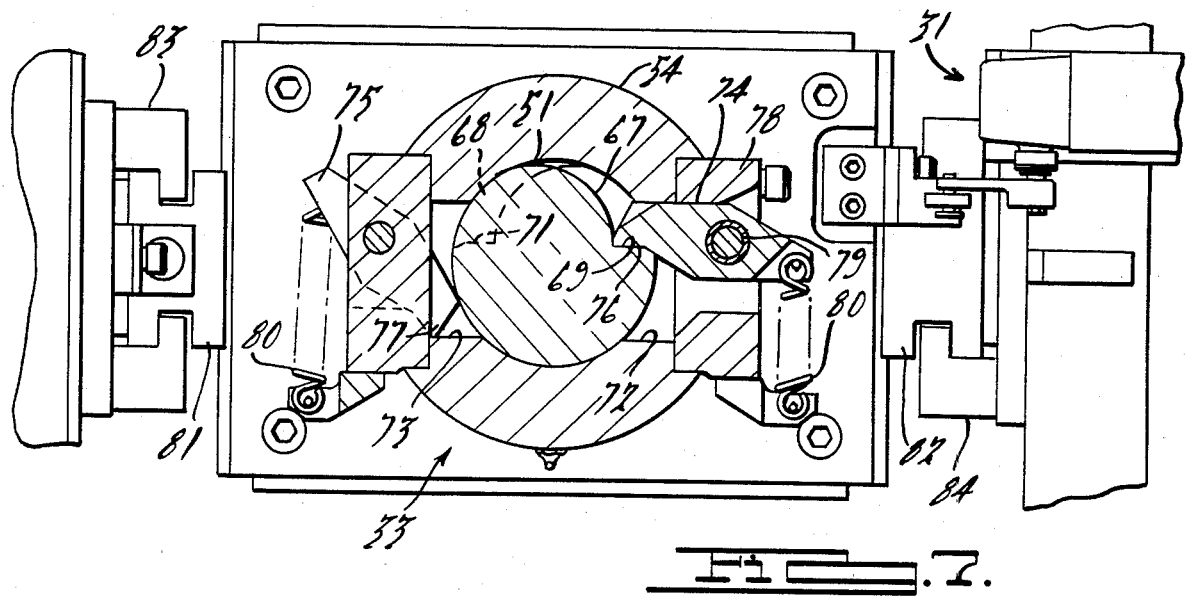
FIG. 7 is an cross-sectional view taken along the line 7—7 of FIG. 10.
Figure 6:
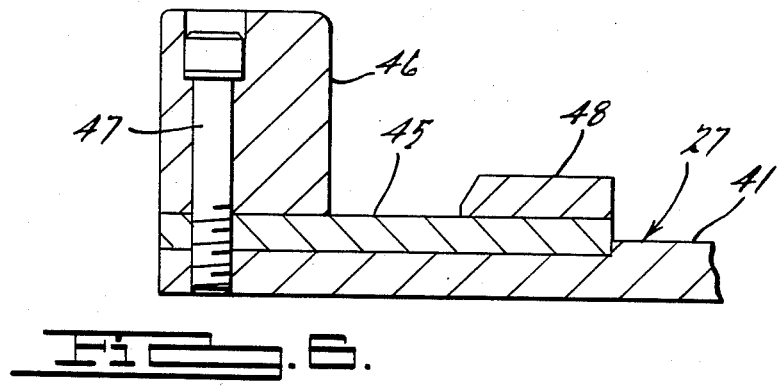
FIG. 6 is an enlarged cross-sectional view taken along the line 6—6 of FIG. 3.

At the same time that the nozzle 32 commences its spraying operation, the motor 56 will be energized so as to rotate the shaft 51 and wheel supporting member 27 in a direction opposite to its previous direction of rotation. In the illustrated embodiment, and considering that the shaft 51 has been in the position shown in FIG. 7, the motor 56 will be energized so as to rotate the shaft 51 in a clockwise direction as shown in FIG. 7. When this rotation occurs, the recess surface 67 will cam the stop lever 74 in a counterclockwise direction and tension the spring 81. As the shaft 51 commences its rotation, the lug 66 associated with the switch assembly 62 will rotate in a counterclockwise direction until it comes into proximity with the switch member 64 at which time the switch 62 will be closed. When this occurs, power to the motor 56 will be stopped and the motor will then coast with the shaft 51 until the surface 71 engages the surface 77 of the stop lever 75 so as to positively stop the rotation of the shaft 51 after 360°. The wheel will then be returned to its home position and the air bags 85 and 86 will both be deflated so as to return the wheel to the conveyor 25.

After the soaped wheel has left the station 21 and a new wheel begins to enter the station 21, the bag 85 will again be inflated so as to place the wheel supporting member 27 in a position to intercept wheel travel. The next time a wheel is intercepted and raised, the motor 56 is energized so as to rotate it in counterclockwise direction as viewed in FIG. 7 so that the stop lever 74 will be disengaged from the shaft 51 and the stop lever 74 will again initiate positive stoppage of the wheel supporting member 27 after it has rotated through a full 360°.

It should be readily apparent that a relatively simple yet highly effective arrangement has been provided for lifting wheels from a conveyor into a work station and also for rotating the wheels through 360° in opposite senses during alternate cycles to achieve the results aforenoted. Although an embodiment of the invention has been illustrated and described, it should be readily apparent that various changes and modifications may suggest themselves to those skilled in the art without deviating from the spirit and scope of the invention, as defined by the appended claims.

We claim:

1. An apparatus for performing an operation on a vehicular wheel before mounting a tire thereon comprising conveyor means for moving wheels along a fixed path through a station where the operation is to be performed, intercept means positioned in proximity to said station and movable between a free position wherein wheels may be moved by said conveyor means through said station, a stop position wherein wheels delivered to said station by said conveyor means will engage said intercept means and be stopped thereby while still on said conveyor means and a work position wherein a wheel engaged with said intercept means will be raised from said conveyor means and power means for moving said intercept means selectively between said positions, said intercept means includes means for stopping successive wheels of varying sizes in rim dimensions and radii and a plurality of support members spaced from said stop means at different distances and cooperating therewith to support said successive wheels of varying sizes whereby said apparatus may operate on said wheels of varying sizes when they are intermixed on said conveyor means.

2. An apparatus as set forth in claim 1 wherein the intercept means comprises a first pair of members defining a V shaped area adapted to engage one side of a rim of the wheel and a further member having a plurality of grooves formed therein, each adapted to engage the opposite side of a rim of wheels of different sizes.

3. An apparatus as set forth in claim 2 wherein the intercept means is movable in a vertical direction for lifting a wheel from the conveyor.

4. An apparatus as set forth in claim 1 wherein the station is a wheel soaping station and further including soaping means for applying soap to a wheel positioned on the intercept means when the intercept means is in its work position.

5. An apparatus as set forth in claim 4 wherein the intercept means is supported for rotation about an axis and the spray means comprises a spray nozzle positioned at a fixed location and adapted to spray onto the rotated wheel.

6. An apparatus for soaping a vehicular wheel before mounting a tire thereon comprising conveyor means for moving wheels along a fixed path through a station where the soaping is to be performed, intercept means positioned in proximity to said station and movable between a free position wherein wheels may be moved by said conveyor means through said station, a stop position wherein wheels delivered to said station by said conveyor means will engage said intercept means and be stopped thereby while still on said conveyor means and a work position wherein a wheel engaged with said intercept means will be raised from said conveyor means, said intercept means being supported for rotation about an axis, rotating means operative to rotate the intercept means and a supported wheel through a first arc from a home position in a first sense and rotate a subsequently supported wheel in an opposite sense through the first arc back to the home position and power means for moving said intercept means selectively between said positions.

7. An apparatus as set forth in claim 6 including positive stop means for limiting the angular position of the intercept means during rotation thereof.

8. An apparatus for performing an operation on a series of sequentially presented vehicle wheels before mounting a tire thereon comprising wheel support means adapted to support a wheel thereon, power means for rotating said wheel support means and a wheel supported thereby in selected opposite directions, and control means for operating said power means to rotate said wheel support means from a home position in a first sense through a predetermined arc to a stop condition when a first wheel is presented on said wheel support means and then in an opposite sense through the predetermined arc back to the home position when another wheel is presented thereon so that sequentially presented wheels will be rotated through the same arc in opposite senses.

9. An apparatus as set forth in claim 8 wherein the predetermined arc comprises about 360°.

10. An apparatus as set forth in claim 8 further including a spray nozzle positioned in proximity to a wheel supported upon the wheel support means.

11. An apparatus as set forth in claim 10 wherein the predetermined arc comprises about 360°.

12. An apparatus as set forth in claim 8 wherein the control means includes a switch for terminating the operation of the power means and a positive stop for engaging the wheel support means and positively stopping the wheel support means when the power has been discontinued.

13. An apparatus as set forth in claim 12 wherein there are a pair of switch means and stop means, each axially spaced from the other and adapted to control the rotation of the wheel support member in one of its senses.

14. An apparatus as set forth in claim 8 wherein the intercept means is adapted to stop and support wheels of a variety of sizes in rim dimensions and radii.

15. An apparatus as set forth in claim 14 wherein the intercept means comprises a first pair of members defining a V-shaped area adapted to engage one side of a rim of the wheel and a further member having a plurality of grooves formed therein, each adapted to engage the opposite side of a rim of wheels of different sizes.

16. An apparatus for performing an operation on a vehicular wheel before mounting a tire thereon comprising conveyor means for moving wheels along a fixed path through a station where the operation is to be performed, intercept means positioned in proximity to said station and movable between a free position wherein wheels may be moved by said conveyor means through said station, a stop position wherein wheels delivered to said station by said conveyor means will engage said intercept means and be stopped thereby while still on said conveyor means and a work position wherein a wheel engaged with said intercept means will be raised from said conveyor means and power means for moving said intercept means selectively between positions, and said intercept means including a first pair of members defining a V-shaped area adapted to engage one side of a rim of the wheel and a further member having a plurality of grooves formed therein, each adapted to engage the opposite side of a rim of wheels of different sizes.

17. An apparatus as set forth in claim 16 wherein the intercept means is movable in a vertical direction for lifting a wheel from the conveyor.

18. An apparatus as set forth in claim 16 wherein the station is a wheel soaping station and further including soaping means for applying soap to a wheel positioned on the intercept means when the intercept means is in its work position.

19. An apparatus as set forth in claim 18 wherein the intercept means is supported for rotation about an axis and the spray means comprises a spray nozzle positioned at a fixed location and adapted to spray onto the rotated wheel.

20. An apparatus as set forth in claim 19 wherein the rotating means is operative to rotate the intercept means and a supported wheel through a first arc from a home position in a first sense and rotate a subsequently supported wheel in an opposite sense through the first arc back to the home position.

21. An apparatus as set forth in claim 20 including positive stop means for limiting the angular position of the intercept means during rotation thereof.

* * * * *

UNITED STATES PATENT AND TRADEMARK OFFICE
CERTIFICATE OF CORRECTION

PATENT NO. : 4,563,975

DATED : January 14, 1986

INVENTOR(S) : Chester P. Kozlowski et al

It is certified that error appears in the above-identified patent and that said Letters Patent is hereby corrected as shown below:

ON THE TITLE PAGE, correct the title as follows:

"Tire Soaping Apparatus For Tire Mounting" should be
--Wheel Soaping Apparatus For Tire Mounting--

Signed and Sealed this

Twenty-eighth Day of April, 1987

Attest:

DONALD J. QUIGG

Attesting Officer     Commissioner of Patents and Trademarks